(12) United States Patent
Takimoto

(10) Patent No.: US 8,162,545 B2
(45) Date of Patent: Apr. 24, 2012

(54) HUB UNIT

(75) Inventor: Masao Takimoto, Kashiwara (JP)

(73) Assignee: JTEKT Corporation, Osaki-shi, Osaka (JP)

(*) Notice: Subject to any disclaimer, the term of this patent is extended or adjusted under 35 U.S.C. 154(b) by 507 days.

(21) Appl. No.: 12/320,572

(22) Filed: Jan. 29, 2009

(65) Prior Publication Data
US 2009/0189437 A1 Jul. 30, 2009

(30) Foreign Application Priority Data
Jan. 30, 2008 (JP) ................. 2008-018717

(51) Int. Cl.
F16C 33/58 (2006.01)
F16C 13/00 (2006.01)
(52) U.S. Cl. ..... 384/544; 384/513; 384/625; 29/898.063
(58) Field of Classification Search .......... 384/448, 384/450, 492, 516, 537, 544, 589, 618, 625, 384/513; 29/898.06, 898.063; 464/178
See application file for complete search history.

(56) References Cited

U.S. PATENT DOCUMENTS

| 6,224,266 | B1 | 5/2001 | Ohtsuki et al. | |
|---|---|---|---|---|
| 6,280,093 | B1 | 8/2001 | Ohtsuki et al. | |
| 6,481,898 | B1* | 11/2002 | Yakura et al. | 384/516 |
| 6,568,855 | B2* | 5/2003 | Nakamura et al. | 384/448 |
| 6,619,852 | B2* | 9/2003 | Toda et al. | 384/537 |
| 6,800,033 | B2* | 10/2004 | Ouchi | 464/178 |
| 7,125,173 | B2* | 10/2006 | Toda et al. | 384/544 |
| 2002/0068639 | A1 | 6/2002 | Tajima et al. | |
| 2002/0072421 | A1 | 6/2002 | Ouchi | |
| 2003/0121153 | A1 | 7/2003 | Tajima et al. | |
| 2004/0047528 | A1* | 3/2004 | Tsujimoto et al. | 384/571 |
| 2008/0205810 | A1* | 8/2008 | Maeda et al. | 384/544 |
| 2008/0219608 | A1* | 9/2008 | Koma et al. | 384/448 |
| 2009/0046971 | A1 | 2/2009 | Hirai et al. | |
| 2009/0074342 | A1 | 3/2009 | Tajima et al. | |
| 2009/0129717 | A1 | 5/2009 | Fujimura et al. | |

FOREIGN PATENT DOCUMENTS

| EP | 1 190 870 A2 | 3/2002 |
|---|---|---|
| JP | 60-141827 | 7/1985 |
| JP | 11-51064 | 2/1999 |
| JP | 2001-180211 A | 7/2001 |
| JP | 2001-180212 A | 7/2001 |

(Continued)

OTHER PUBLICATIONS

European Search Report dated May 28, 2009.

(Continued)

Primary Examiner — Marcus Charles
(74) Attorney, Agent, or Firm — McGinn Intellectual Property Law Group, PLLC

(57) ABSTRACT

A hub unit is equipped with an inner member having an inner ring raceway formed on its outer peripheral face, an outer member having an outer ring raceway formed on its inner peripheral face, and a plurality of rolling elements provided between the inner ring raceway and the outer ring raceway. At least one of the inner ring raceway and the outer ring raceway has a rolling contact zone on which an induction-hardened layer is formed. The hardened layer has a depth of about 1.5 to 1.9 mm at a distance of 1 mm inward from each end of the hardened layer.

9 Claims, 2 Drawing Sheets

FOREIGN PATENT DOCUMENTS

| | | | |
|---|---|---|---|
| JP | 2001-294005 A | | 10/2001 |
| JP | 2002-61661 A | | 2/2002 |
| JP | 2004308829 A | * | 11/2004 |
| JP | 2005-214229 A | | 8/2005 |
| JP | 2005214229 A | * | 8/2005 |
| JP | 2006-137297 A | | 6/2006 |
| JP | 2007285424 A | * | 11/2007 |
| JP | 2007303587 A | * | 11/2007 |
| WO | WO 2007/029658 A1 | | 3/2007 |
| WO | WO 2007/125646 A1 | | 11/2007 |

OTHER PUBLICATIONS

Japanese Office Action dated Feb. 14, 2012, with partial English translation.

* cited by examiner

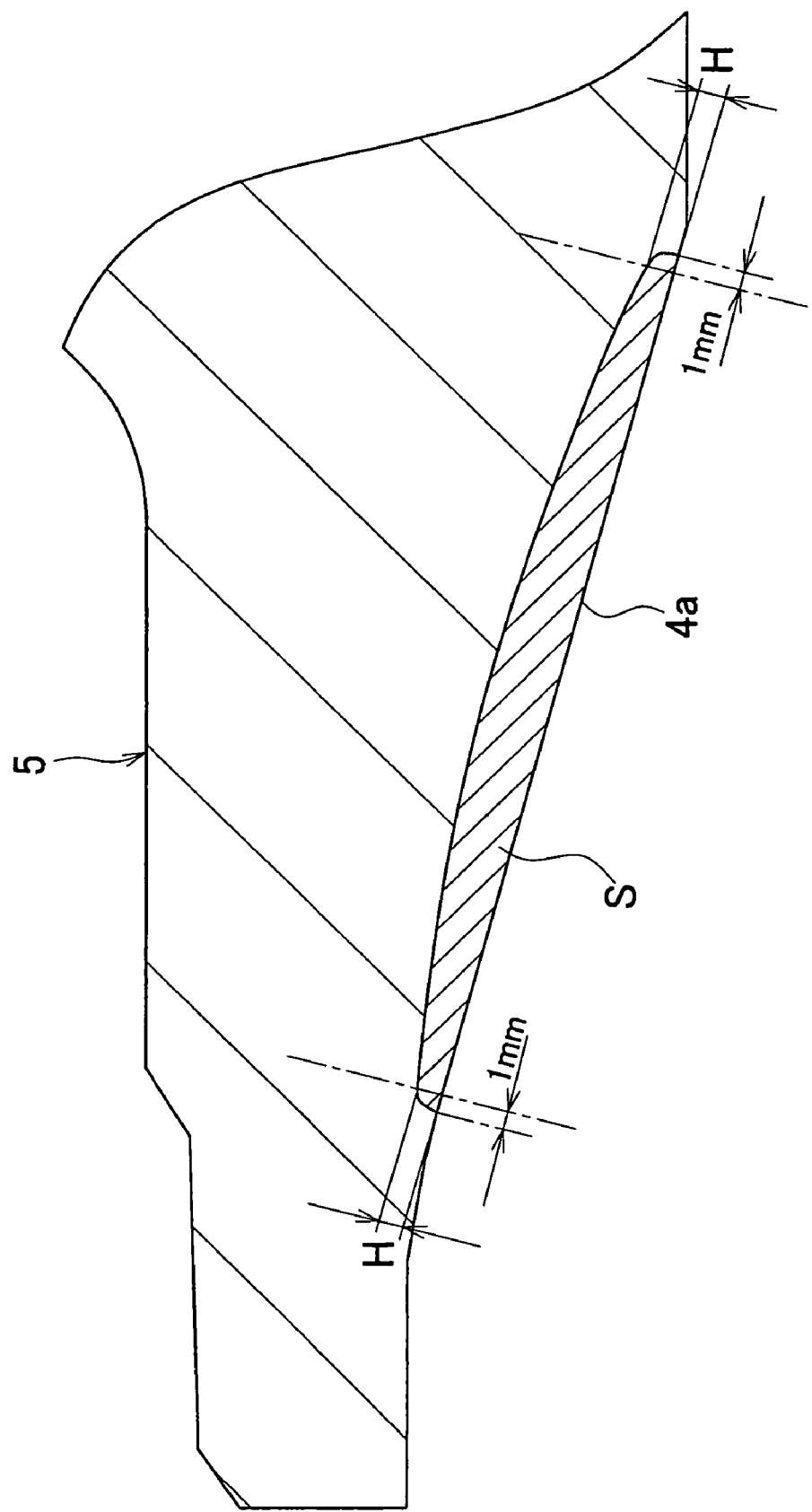

HUB UNIT

CROSS REFERENCE TO RELATED APPLICATION

The disclosure of Japanese Patent Application No. 2008-18717 filed on Jan. 30, 2008 including the specification, drawings and abstract is incorporated herein by reference in its entirety.

BACKGROUND OF THE INVENTION

1. Field of the Invention

The invention relates to a hub unit.

2. Description of the Related Art

A hub unit is used to rotatably support wheels of an automobile on a suspension system. The hub unit is includes an inner member, such as a hub wheel, in which an inner ring raceway is formed on its outer peripheral face and an outer member, such as an outer ring, in which an outer ring raceway is formed on its inner peripheral face, and a plurality of rolling elements provided between the inner ring raceway and the outer ring raceway. The hub wheel includes a flange portion on which, for example, a wheel and a brake disc may be fitted.

The inner ring raceway and the outer ring raceway repeatedly receive loads from the plurality of the rolling elements through long-time use and undergo rolling fatigue. Rolling fatigue causes the inner ring raceway and the outer ring raceway to flake and brings the life of a bearing to an end. Thus, to prolong the life of the bearing, there is proposed a hub unit having an induction-hardened layer formed on an inner ring raceway of a hub wheel provided with a flange portion (e.g., see Japanese Patent Application Publication No. 60-141827 (JP-A-60-141827)).

However, in the hub unit described in Japanese Patent Application Publication No. 60-141827 (JP-A-60-141827), the depth of the hardened layer tends to be increased in order to ensure appropriate hardness at a predetermined depth of the hardened layer. For this reason, the time required for induction hardening is long and hence constitutes a factor in a rise in product cost. To prevent a rise in product cost, it is appropriate to minimize the depth of the hardened layer. However, if the hardened layer is too shallow, the raceways are susceptible to flaking and the life of the bearing is shortened. That is, it has been very difficult to achieve a reduction in production cost while maintaining the sufficient life of the bearing.

SUMMARY OF THE INVENTION

The invention provides a hub unit that makes it possible to reduce production cost while maintaining the life of a bearing.

A hub unit according to a first aspect of the invention is equipped with an inner member having an inner ring raceway on the outer peripheral face of the inner member, an outer member having an outer ring raceway on the inner peripheral face of the outer member, and a plurality of rolling elements provided between the inner ring raceway and the outer ring raceway. In the vehicular hub unit, at least one of the inner ring raceway and the outer ring raceway has a rolling contact zone on which an induction-hardened layer is formed, wherein a depth of the hardened layer is about 1.5 to 1.9 mm at a distance of 1 mm inward from each end of the hardened layer. The depth of the hardened layer as mentioned herein means the distance from a raceway face that the hardened layer penetrates the outer member. Further, the rolling contact zone means a range where each of the raceways may be in rolling contact with the rolling elements.

In the aforementioned vehicular hub unit, if the depth of the hardened layer is smaller than 1.5 mm, the hardened layer is shallow and premature flaking of the raceways may occur. Meanwhile, if the depth of the hardened layer is larger than 1.9 mm, the time required for induction hardening is increased. That is, by setting the depth of the hardened layer between 1.5 mm and 1.9 mm, the time required for induction hardening may be shortened while effectively minimizing premature flaking.

A hub unit according to a second aspect of the invention is equipped with an inner member having an inner ring raceway formed on its outer peripheral face, an outer member having an outer ring raceway formed on its inner peripheral face, a plurality of rolling elements provided between the inner ring raceway and the outer ring raceway, a plurality of cages that retains the plurality of the rolling elements at intervals of a predetermined distance between the inner ring raceway and the outer ring raceway, and a seal member that seals a space formed between the inner ring raceway and the outer ring raceway at each end of the outer member. In the vehicular hub unit, at least one of the inner ring raceway and the outer ring raceway has a rolling contact zone on which an induction-hardened layer is formed, wherein a depth of the hardened layer is about 1.5 to 1.9 mm at a distance of 1 mm inward from each end of the hardened layer.

According to the aforementioned aspects of the invention, the time required for induction hardening is shortened while effectively minimizing premature flaking. Therefore, a reduction in product cost may be achieved while maintaining the life of the bearing.

BRIEF DESCRIPTION OF THE DRAWINGS

The foregoing and further features and advantages of the invention will become apparent from the following description of an example embodiment with reference to the accompanying drawings, wherein like numerals are used to represent like elements and wherein:

FIG. 2 is a partially enlarged view showing an outer ring raceway.

DETAILED DESCRIPTION OF EMBODIMENT

Figure 1:
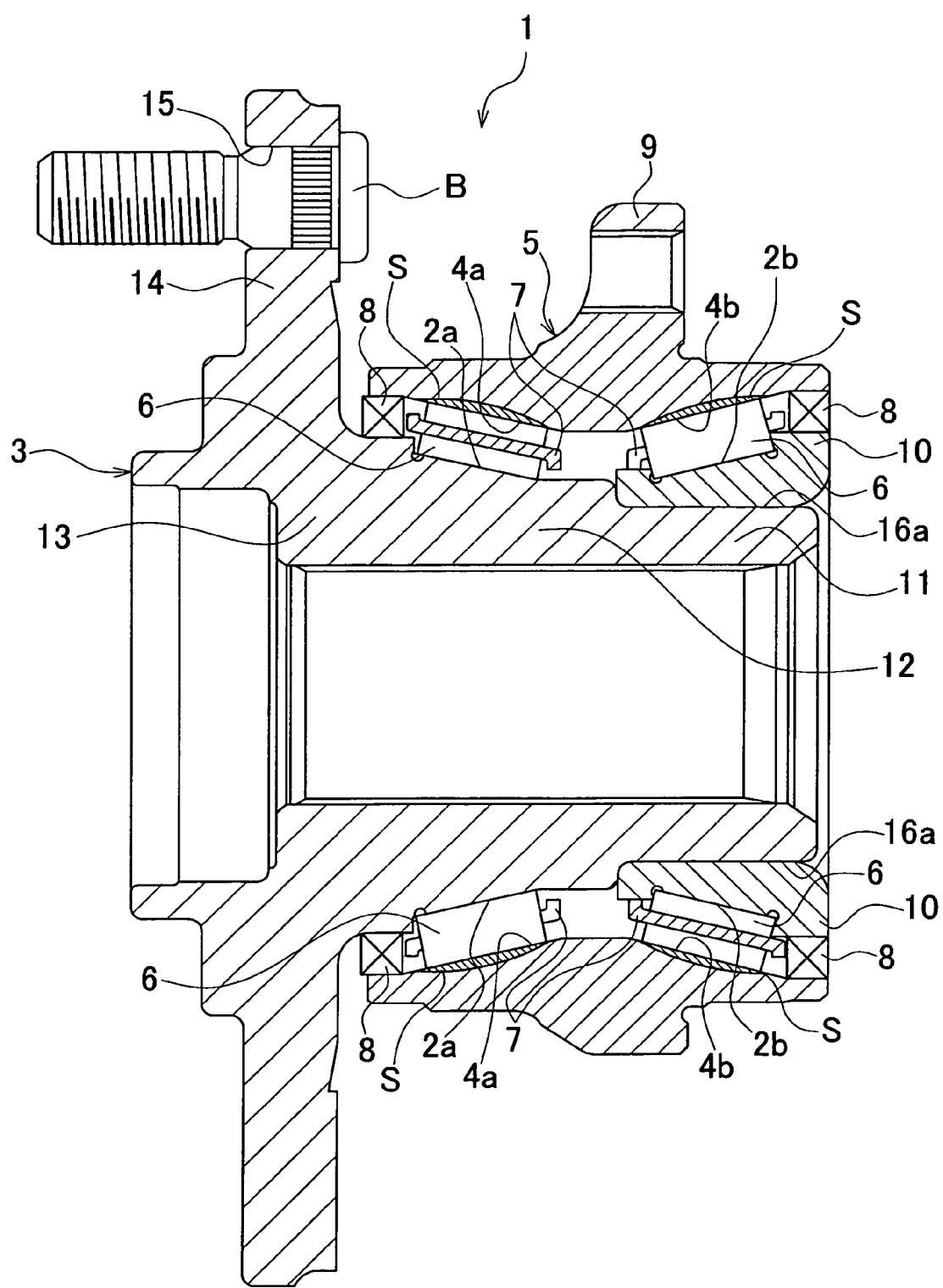
FIG. 1 is a partial sectional view showing a vehicular hub unit according to the embodiment of the invention.

The embodiment of the invention will be described hereinafter with reference to the drawings. FIG. 1 is a partial sectional view showing a hub unit 1 according to the embodiment of the invention. FIG. 2 is a partially enlarged view showing the outer ring raceway. The right-and-left direction in FIG. 1 is referred to as the axial direction of the hub unit 1, the left side in FIG. 1 is referred to as the outboard side, and the right side in FIG. 1 is referred to as the inboard side.

As shown in FIGS. 1 and 2, the hub unit 1 rotatably supports wheels of an automobile on a suspension system, and is equipped with a hub wheel 3 as an inner member having a pair of inner ring raceways 2a, 2b on an outer peripheral face of the inner member, and an outer ring 5 as an outer member having a pair of outer ring raceways 4a, 4b on an inner peripheral face of the outer member.

Further, the hub unit 1 is equipped with a plurality of rolling elements 6 provided between the inner ring raceways 2a, 2b and the outer ring raceways 4a, 4b, and cages 7 for retaining the plurality of the rolling elements 6 at intervals of a predetermined distance in a circumferential direction. An annular space formed between the hub wheel 3 and the outer ring 5 is sealed using seal members 8 at each end of the outer ring 5. Although the hub unit 1 shown in FIG. 1 is a tapered roller bearing that uses roller bearings as rolling elements, a cup as an outer ring and a cone as an inner ring, a ball bearing (6) that uses a roller instead of the tapered roller may replace the tapered roller bearing.

The outer ring 5 is made of, for example, carbon steel (S55C), and an induction-hardened layer S is formed on a rolling contact zone of each of the pair of the outer ring raceways 4a, 4b. Further, the outer ring 5 is provided with a knuckle flange 9 to which a steering knuckle (not shown) of a steering mechanism is fixed. The knuckle flange 9 extends radially outward from an outer peripheral face of the outer ring 5. The hardened layer S may be formed either on the inner ring raceways 2a, 2b only or on both the inner ring raceways 2a, 2b and the outer ring raceways 4a, 4b. Further, the rolling contact zone as described herein means a range where each of the raceways may be in rolling contact with the rolling elements.

The hub wheel 3 is made of, for example, carbon steel (S55C), and is provided with a small-diameter portion 11 with a cylindrical cross-section on which a cylindrical inner ring member 10 is fitted, an intermediate-diameter portion 12 with a cylindrical cross-section that is contiguous with the small-diameter portion 11 toward the outboard side, and a large-diameter portion 13 with a cylindrical cross-section that is contiguous with the intermediate-diameter portion 12 toward the outboard side. Further, the hub wheel 3 is provided with a flange portion 14 for mounting a traveling wheel, a brake disc, and the like. The flange portion 14 extends radially outward from the outer peripheral face of the large-diameter portion 13. Further, a plurality of through-holes 15 is formed in the flange portion 14, and hub bolts B are securely press-fitted through each through-holes 15.

The inner ring member 10 is inserted such that an inner peripheral face of the inner ring member 10 is fitted snugly against an outer peripheral face 16a of the small-diameter portion 11. Further, the inner ring raceway 2b is provided radially outward of the inner ring member 10 and faces the outer ring raceway 4b on the inboard side. The inner ring raceway 2a is provided on the outer peripheral face of the large-diameter portion 13 and faces the outer ring raceway 4a on the outboard side.

As shown in FIG. 2, the hardened layer S is formed with a convex cross-section such that a depth H of the hardened layer S at positions located inward of both axial ends of the hub unit 1 falls within a range of 1.5 to 1.9 mm. The depth H of the hardened layer means the distance from the raceway face that the hardened layer S penetrates the outer ring 5. It is appropriate to form this hardened layer S through a hardening process that includes heating the outer ring raceways 4a, 4b through induction heating with a high-frequency current, and a tempering process within a temperature range of 150 to 200° C.

In the hub unit 1 constructed as described above, if the depth H of the hardened layer is smaller than 1.5 mm, flaking of the outer ring raceways 4a, 4b occurs at an early stage. Meanwhile, if the depth H of the hardened layer is larger than 1.9 mm, the time required for induction hardening is increased. That is, by setting the depth H of the hardened layer between 1.5 mm and 1.9 mm, the time required for induction hardening may be shortened while effectively minimizing premature flaking the outer ring raceways 4a, 4b. Further, the influence of heat on the outer ring 5 may be reduced by setting the depth H of the hardened layer small. Thus, the thermo-expansion of the outer ring 5 is suppressed, and the rotational accuracy of the outer ring 5 is enhanced. Accordingly, the outer ring 5 rotates stably, and the life of the hub unit 1 is prolonged.

The invention is not limited to the foregoing embodiment thereof. For example, the flange portion 14 may alternatively be provided on the outer peripheral face of the outer member 5. The above described embodiment is helpful for vehicle hub unit.

What is claimed is:

1. A hub unit comprising:
   an inner member having an inner ring raceway formed on its outer peripheral face;
   an outer member having an outer ring raceway formed on its inner peripheral face; and
   a plurality of rolling elements provided between the inner ring raceway and the outer ring raceway,
   wherein at least one of the inner ring raceway and the outer ring raceway has a rolling contact zone on which an induction-hardened layer is formed, the induction-hardened layer having a convex cross-section, and the induction-hardened layer has a depth of about 1.5 to 1.9 mm at a distance of 1 mm inward from each end of the induction-hardened layer.

2. The hub unit according to claim 1, wherein the hub unit is used for a vehicle.

3. The hub unit according to claim 1, wherein the rolling elements comprise tapered rollers.

4. The hub unit according to claim 1, wherein the inner member includes two inner ring raceways and the outer member includes two outer ring raceways.

5. The hub unit according to claim 4, wherein said induction-hardened layer comprises two induction-hardened layer portions formed on the two outer ring raceways apart from each other.

6. The hub unit according to claim 1, wherein a depth of the induction-hardened layer is greater at a distance farther than 1 mm inward from said each end of the induction-hardened layer that at said distance of 1 mm inward from each end of the induction-hardened layer.

7. The hub unit according to claim 1, wherein the depth of the induction-hardened layer increases from each end of the induction-hardened layer toward a center of the induction-hardened layer.

8. A hub unit comprising:
   an inner member having an inner ring raceway formed on its outer peripheral face;
   an outer member having an outer ring raceway formed on its inner peripheral face;
   a plurality of rolling elements provided between the inner ring raceway and the outer ring raceway;
   a plurality of cages that retains the plurality of the rolling elements at intervals of a predetermined distance between the inner ring raceway and the outer ring raceway; and
   a seal member that seals a space formed between the inner ring raceway and the outer ring raceway at each end of the outer member,
   wherein at least one of the inner ring raceway and the outer ring raceway has a rolling contact zone on which an induction-hardened layer is formed, the induction-hardened layer having a convex cross-section, and the induction-hardened layer has a depth of about 1.5 to 1.9 mm at a distance of 1 mm inward from each end of the induction-hardened layer.

9. The hub unit according to claim 8, further comprising:
   a cylindrical inner ring member fitted on the inner member,
   wherein the inner member includes a small-diameter portion with a cylindrical cross-section on which the cylindrical inner ring member is fitted, an intermediate-diameter portion with a cylindrical cross-section that is contiguous with the small-diameter portion, and a large-diameter portion with a cylindrical cross-section that is contiguous with the intermediate-diameter portion.

* * * * *